(12) United States Patent
Mermans (10) Patent No.: US 8,958,544 B2
(45) Date of Patent: Feb. 17, 2015

(54) TIME-ALIGNMENT OF CROSSTALK ACQUISITION PHASES BETWEEN MULTIPLE JOINING LINES

(75) Inventor: Thomas Mermans, Ghent (BE)

(73) Assignee: Alcatel Lucent, Boulogne-Billancourt (FR)

( * ) Notice: Subject to any disclaimer, the term of this patent is extended or adjusted under 35 U.S.C. 154(b) by 15 days.

(21) Appl. No.: 13/990,330

(22) PCT Filed: Dec. 7, 2011

(86) PCT No.: PCT/EP2011/072063
§ 371 (c)(1),
(2), (4) Date: May 29, 2013

(87) PCT Pub. No.: WO2012/076598
PCT Pub. Date: Jun. 14, 2012

(65) Prior Publication Data
US 2013/0251141 A1   Sep. 26, 2013

(30) Foreign Application Priority Data

Dec. 10, 2010 (EP) .................................... 10306390

(51) Int. Cl.
*H04M 9/08* (2006.01)
*H04B 3/32* (2006.01)
(Continued)

(52) U.S. Cl.
CPC .................. *H04B 3/32* (2013.01); *H04B 3/464* (2013.01); *H04M 11/062* (2013.01)
USPC ....................... 379/406.06; 370/201

(58) Field of Classification Search
CPC ................. H04B 3/32; H04M 9/087
USPC ........... 379/406.06; 370/201; 709/232
See application file for complete search history.

(56) References Cited

U.S. PATENT DOCUMENTS

| 5,768,529 A * | 6/1998 | Nikel et al. ................... 709/232 |
| 2005/0175078 A1 | 8/2005 | Redfern |
| 2011/0261674 A1 * | 10/2011 | Maes et al. ................... 370/201 |

FOREIGN PATENT DOCUMENTS

| EP | 2200185 A1 | 6/2010 |
| EP | 2200185 A1 * | 6/2010 |

OTHER PUBLICATIONS

Oksman, V. et al. "The ITU-T's New G.vector Standard Proliferates 100 Mb/s DSL". IEEE Communications Magazine, IEEE Service Center vol. 48, No. 10, pp. 140-148; Piscataway, US; Oct. 2010; xp011319418.

(Continued)

*Primary Examiner* — Fan Tsang
*Assistant Examiner* — Van D Huynh
(74) *Attorney, Agent, or Firm* — Harness, Dickey & Pierce (57) ABSTRACT

In an embodiment, the access node includes first and second transceiver units for initializing first and second communication channels, respectively, over first and second communication lines, respectively. The initialization of the first and second communication channels respectively including first and second handshake phases wherein peer transceiver units exchange capabilities and select (i) a common mode of operation, (ii) first and second crosstalk channel acquisition phases from the first and second communication lines, and (iii) first and second generic initialization phases. The access node further includes a line initialization controller configured to stretch the execution of the first handshake phase with respect to the execution of the second handshake phase so as to shorten a time difference between respective entries into the first and second crosstalk channel acquisition phases.

15 Claims, 2 Drawing Sheets (51) Int. Cl.
*H04B 3/46* (2006.01)
*H04M 11/06* (2006.01)

(56) References Cited

OTHER PUBLICATIONS

Thyagarajan, U. "ADSL G:HS: Proposal to include a mode of operation to reduce Handshake Time in ADSL2 and ADSL2+". International Telecommunication Union, Geneva; Study Group 15, pp. 1-7; Oct. 2003; xp017417690.

International Search Report PCT/ISA/210 for PCT/EP2011/072063 dated Jan. 31, 2012.

"Self-FEXT Cancellation (Vectoring) for Use with VDSL2 Transceivers," Series G: Transmission Systems and Media, Digital Systems and Networks, Digital Sections and Digital Line System—Access Networks, ITU-T Telecommunication Standardization Sector of ITU, G.993.5, Apr. 2010.

\* cited by examiner

TIME-ALIGNMENT OF CROSSTALK ACQUISITION PHASES BETWEEN MULTIPLE JOINING LINES

This application is the national phase under 35 U.S.C. §371 of PCT International Application No. PCT/EP2011/072063 which has an International filing date of Dec. 7, 2011, which claims priority to European patent application number 10306390.5 filed Dec. 10, 2010; the entire contents of each of which are hereby incorporated by reference.

TECHNICAL FIELD OF THE INVENTION

The present invention relates to access nodes providing broadband communication services to subscribers.

TECHNICAL BACKGROUND OF THE INVENTION

Crosstalk (or inter-channel interference) is a major source of channel impairment for Multiple Input Multiple Output (MIMO) communication systems, such as Digital Subscriber Line (DSL) communication systems.

As the demand for higher data rates increases, DSL systems are evolving toward higher frequency bands, wherein crosstalk between neighboring transmission lines (that is to say, transmission lines that are in close vicinity such as twisted copper pairs in a cable binder) is more pronounced (the higher frequency, the more coupling).

A MIMO system can be described by the following linear model:

$$Y(f) = H(f)X(f) + Z(f) \quad (1)$$

wherein the N-component complex vector X, respectively Y, denotes a discrete frequency representation of the symbols transmitted over, respectively received from, the N channels, wherein the N×N complex matrix H is referred to as the channel matrix: the (i,j)-th component of the channel matrix H describes how the communication system produces a signal on the i-th channel output in response to a symbol being transmitted to the j-th channel input; the diagonal elements of the channel matrix describe direct channel coupling, and the off-diagonal elements of the channel matrix describe inter-channel coupling (also referred to as the crosstalk coefficients),
and wherein the N-component complex vector Z denotes additional noise present over the N channels, such as alien interference, thermal noise and Radio Frequency Interference (RFI).

Different strategies have been developed to mitigate crosstalk and to maximize effective throughput, reach and line stability. These techniques are gradually evolving from static or dynamic spectral management techniques to multi-user signal coordination (or vectoring).

One technique for reducing inter-channel interference is joint signal precoding: the transmit data symbols are jointly passed through a precoding matrix before being transmitted over the respective communication channels. The precoding matrix is such that the concatenation of the precoder and the communication channel results in little or no interference at the receiver. This is achieved by adding to the original signal an anti-phase signal that is the inverse of an estimate of the aggregate crosstalk signal.

A further technique for reducing inter-channel interference is joint signal post-processing: the received data symbols are jointly passed through a crosstalk cancellation matrix before being detected. The crosstalk cancellation matrix is such that the concatenation of the post-coder and the communication channel results in little or no interference at the receiver. This is achieved by subtracting from the received signal an estimate of the aggregate crosstalk signal.

Signal vectoring is typically performed at a traffic aggregation point, whereat all the data symbols that are to be concurrently transmitted and/or received are available. Signal precoding is particularly suited for downstream communication, while signal post-processing is particularly suited for upstream communication.

The choice of the vectoring group, that is to say the set of communication lines, the signals of which are jointly processed, is rather critical for achieving good crosstalk cancellation performances. Within that group, each communication line is considered as a disturbing line inducing crosstalk into the other communication lines of the group, and the same communication line is considered as a victim line receiving crosstalk from the other communication lines of the group. Crosstalk from lines that do not belong to the vectoring group is treated as alien noise and is not canceled.

Ideally, the vectoring group should match the whole set of communication lines that physically and noticeably interact with each other. Yet, limited vectoring capabilities and/or specific network topologies may prevent such an exhaustive approach, in which case the vectoring group would include a sub-set only of all the physically interacting lines, thereby yielding limited crosstalk cancellation performances.

The performance of signal precoding and post-processing depends critically on the component values of the precoding and cancellation matrix respectively, which component values are to be computed and updated according to the actual (and varying) crosstalk coupling functions between the respective communication channels.

A prior art method for estimating the crosstalk coefficients comprises the steps of:
simultaneously transmitting a plurality of mutually orthogonal crosstalk pilot sequences of length L through respective ones of a plurality of disturber channels,
measuring errors induced over a victim channel while the pilot sequences are being transmitted,
correlating the error measurements with respective ones of the plurality of crosstalk pilot sequences, thereby yielding a plurality of correlated error measurements,
estimating the crosstalk coefficients from the plurality of disturber channels into the victim channel based on respective ones of the plurality of correlated error measurements.

That is, transceiver units send mutually orthogonal downstream and/or upstream pilot signals. Error samples, measuring both interference and noise over the victim channel, are fed back to a Vectoring Control Entity (VCE). Error samples contain both amplitude and phase information on a per-tone basis, or on a per-group-of-tones basis. The error samples are correlated with a given pilot sequence in order to obtain the crosstalk contribution from a specific line. To reject the crosstalk contribution from the other lines, i.e. in order to fulfill the orthogonality requirement, a multiple of L error samples shall be collected and processed. The crosstalk estimates are used for updating the precoding and/or cancellation matrix. The process can be repeated as needed to obtain more and more accurate estimates.

The orthogonality requirement further implies that the length L of the pilot sequences is lower-bounded by the size of the vectoring group: the more channels, the more lengthy the pilot sequences, the longer the estimation of the crosstalk coefficients.

This prior art method has been adopted by the International Telecommunication Union (ITU) for use with VDSL2 transceivers, and is described in the recommendation entitled "Self-FEXT Cancellation (vectoring) For Use with VDSL2 Transceivers", ref. G.993.5 (April 2010).

In this recommendation, it is currently envisaged that the pilot signals would be sent on the so-called SYNC symbols, Which occur periodically after every 256 DATA symbols.

On a given disturber line, a representative subset of the active carriers (or tones) of the SYNC symbol are 4-QAM modulated by the same pilot digit (+1 or −1) from a given pilot sequence, and thus all transmit one of two complex constellation points, either '1+j' corresponding to '+1', or '−1−j' corresponding to '−1'. The remaining carriers of the SYNC symbol keeps on carrying the typical SYNC-FLAG for EOC message acknowledgment.

On a given victim line, error samples are measured and reported for a specific SYNC symbol to the VCE for further crosstalk estimation.

In G.993.5, it is further assumed that the access node transmits and receives the SYNC symbols over the vectored lines synchronously (super frame alignment) so as pilot signal transmission and error measurements occur simultaneously.

If a line comes into service (e.g., after modem start-up at subscriber premises), the crosstalk coefficients from the new joining line into the already active lines need to be estimated first, and the precoder and/or post-coder be updated accordingly, before the new joining line can transmit at full power over the DATA symbols, else the raising interference may bring about a line retrain on a few active lines (if the newly induced interference exceeds the configured noise margin). Similarly, the crosstalk coefficients from the already active lines into the joining line need to be estimated first, and the precoder and/or post-coder be updated accordingly, before the new joining line starts determining respective carrier bit loadings and gains so as to take full profit from the vectoring gains.

G.993.5 defines new crosstalk acquisition phases during the VDSL2 initialization procedure for acquiring the crosstalk coefficients from the new joining line into the active lines, and vice-versa.

A first crosstalk acquisition phase is carried out after the HANDSHAKE phase, whereby peer transceiver units acknowledges their mutual presence, exchange their respective capabilities and agree on a common mode of operation, and the CHANNEL DISCOVERY phase, during which peer transceiver units exchange basic communication parameters through the SOC channel while transmitting at full power within the assigned communication band. The first crosstalk acquisition phase is termed O-P-VECTOR 1 and R-P-VECTOR 1 for downstream and upstream communication respectively, and aims at estimating the downstream and upstream crosstalk coefficients from the initializing line into the already active lines. O-P-VECTOR 1 and R-P-VECTOR 1 signals comprise SYNC symbols only, which are aligned with the SYNC symbols of the active lines, and thus do not impair communication over the active lines. O-P-VECTOR 1 is followed by O-P-VECTOR 1-1; R-P-VECTOR 1 is followed by R-P-VECTOR 1-1 and R-P-VECTOR 1-2.

A second crosstalk acquisition phase is carried out after the CHANNEL TRAINING phase takes place, that is to say after the time equalizer and/or the echo canceler have been adjusted, and before the CHANNEL ANALYSIS AND EXCHANGE phase, that is to say before signal to Noise and Interference Ratio (SNIR) is measured and corresponding bit loading and gain values are determined for the respective carriers. The second crosstalk acquisition phase is termed O-P-VECTOR 2-1 and R-P-VECTOR 2 for downstream and upstream communication respectively, and aims at estimating the crosstalk coefficients from the already active lines into the initializing line.

A clause in §10.3 of G.993.5 ITU recommendation states that "if several lines are initialized simultaneously, the initialization procedures of these lines have to be aligned in time, so that all lines pass the vectoring-related phases simultaneously (see clauses 10.3.3.6 and 10.4.3.9)". Further in §10.3.3.6 op. cit., the following further technical details are mentioned in case multiple lines are initialized:

"The downstream crosstalk channels from the initializing lines into the active lines of the vector group should be estimated simultaneously by insuring that O-P-VECTOR 1 signals are sent on all initialization lines during the estimation. This can be done by controlling the end and the start of O-P-VECTOR 1 in each line.

The upstream crosstalk channels between the initializing lines and the active lines of the vector group should be estimated simultaneously by insuring that R-P-VECTOR 1 signals are sent on all initialization lines during the estimation. This can be done by controlling the end of R-P-VECTOR 1 with the O-P-SYNCHRO V1 signal in each line."

One option would be to require that lines in a vectoring group are always activated sequentially. However, this may lead to a denial of service for any further lines that want to join after a single line is being initialized.

The contribution entitled "G.vector: Facilitating simultaneous initialization of multiple joining lines" from Alcatel-Lucent, and submitted during the ITU session that took place in Atlanta in February 2009, ref. 09AG-044, proposes the following algorithm for optimizing simultaneous joining of multiple lines:

"The VCE always maintains a queue of lines that have requested joining, but have not yet joined.

When ready, e.g., when a previous set of lines have finished joining, the VCE starts initialization for all lines in the queue (thus emptying the queue).

Initialization proceeds independently until it reaches the O-P-VECTOR 1 state. Each line will stay in the O-P-VECTOR 1 state until receiving OP-SYNCHRO V1 signal from its respective VTU-O (under VCE control). The VCE maintains lines in O-P-VECTOR 1 until all crosstalk coefficients targeted by this estimation stage, on all lines, have been estimated with sufficient accuracy. Then VCE sends release signal allowing all lines in the group to exit O-P-VECTOR 1, and enter CHANNEL-DISCOVERY."

This prior art method is disadvantageous in that the transceiver units shall remain in O-P-VECTOR 1 state till all simultaneously joining lines reaches O-P-VECTOR 1. Then, a full pilot sequence transmission shall take place, meaning at least L further SYNC symbols shall be awaited, to acquire the very first crosstalk estimates. Nonetheless, the O-P-VECTOR 1 phase is upper-bounded in time by G.993.5 recommendation: O-P-VECTOR 1 shall be less than 1024 SYNC symbols long, meaning $1024 \times 257 \times 250 \times 10^{-6} \approx 65s$. Queuing the lines in this phase directly impacts the amount of remaining time for crosstalk estimation, and thus the accuracy of the crosstalk estimation process, and eventually the performances of vectoring.

SUMMARY OF THE INVENTION

It is an object of the present invention to improve parallel joining of multiple lines into a group of vectored communication lines.

In accordance with a first aspect of the invention, an access node for providing broadband communication services to subscribers, and comprising a first transceiver unit for initializing a first communication channel over a first communication line and a second transceiver unit for subsequently initializing a second communication channel over a second communication line, which initialization of said first and second communication channels respectively comprising first and second handshake phases whereby peer transceiver units exchange capabilities and select a common mode of operation, first and second crosstalk channel acquisition phases from said first and second communication lines into further active communication lines, and further first and second generic initialization phases. The access node further comprises a line initialization controller configured to stretch the execution of said first handshake phase with respect to the execution of said second handshake phase so as to shorten a time difference between respective entries into said first and second crosstalk channel acquisition phases.

In accordance with another aspect of the invention, a method for initializing communication channels over communication lines comprises the step of initializing a first communication channel over a first communication line and subsequently initializing a second communication channel over a second communication line, which initialization of said first and second communication channels respectively comprising first and second handshake phases whereby peer transceiver units exchange capabilities and select a common mode of operation, first and second crosstalk channel acquisition phases from said first and second communication lines into further active communication lines, and further first and second generic initialization phases. The method further comprises the step of stretching the execution of said first handshake phase with respect to the execution of said second handshake phase so as to shorten a time difference between respective entries into said first and second crosstalk channel acquisition phases.

By controlling the period of time over which the handshake procedure spans, one closely controls the time at which a communication line enters the crosstalk acquisition phase. If the time difference between the respective entries into the crosstalk acquisition phase is minimized or at least shortened, then the time available for crosstalk estimation is increased, leading to better vectoring performances.

The execution of the first handshake procedure can be stretched while the execution of the second handshake procedure is not so as the first communication line enters the crosstalk acquisition phase when the second communication line is expected to do so, or alternatively both the first and second handshake procedures can be stretched so as the first and second communication lines enter the crosstalk acquisition phase at a further time, e.g. when a third communication line is expected to enter the crosstalk acquisition phase or alternatively at an arbitrary time scheduled by the access node.

The first communication line may indifferently enter the crosstalk acquisition phase just before or just after the second communication line does so.

The minimum time difference that can be reached between respective entries into the crosstalk acquisition phase depends on the exact technique that is used for stretching the execution of the handshake procedure as it will be set forth in the following.

In one embodiment of the invention, stretching the execution of said first handshake phase with respect to the execution of said second handshake phase is achieved by re-iterating through a particular message exchange during said first handshake phase with a number of iterations of said particular message exchange during said first handshake phase greater than a respective number of iterations of said particular message exchange during said second handshake phase.

By repeating a specific message exchange (or message round) of the handshake phase, which repetition being allowed by the standard, one can postpone the entry into the crosstalk acquisition phase by a certain amount of time without the peer transceiver unit detecting a handshake failure and rebooting (meaning some additional random time that would ultimately depend on each and every customer product manufacturer), thereby reducing by the same amount the initial time difference between the respective entries into the crosstalk acquisition phase.

One can repeat that specific message exchange over the first communication line, and possibly over the second communication line too. Yet, the number of iterations over the first communication line shall be higher than the number of iterations over the second communication line.

In one embodiment of the invention, said particular message exchange comprises the exchange of a Capability List Request CLR message, a Capability List CL message and a Mode Selection MS message, and re-iteration through said particular message exchange is achieved by issuing a Request REQ-CLR message for a capability List Request CLR message.

This embodiment relies on a provision of the ITU recommendation entitled "Handshake Procedures for Digital Subscriber Line (DSL) Transceivers", ref. G.994.1 (February 2007), allowing a transceiver unit to request again capabilities from a peer transceiver unit instead of acknowledging the selected mode of operation.

In one embodiment of the invention, stretching the execution of said first handshake phase with respect to the execution of said second handshake phase is achieved by intentionally delaying response messages during said first handshake phase by an amount of time averagely greater than a respective amount of time used during said second handshake phase.

By voluntarily delaying (yet still within the timeout boundaries) response messages, such as CL or MS or ACK messages, to request messages, such as CLR or MS or MP or MR message, one can also postpone the entry into the crosstalk acquisition phase over the respective communication line.

In one embodiment of the invention, response messages during said second handshake phase are intentionally delayed by an amount of time averagely greater than a respective amount of time used during said first handshake phase.

This embodiment is particularly advantageous when used over the second communication line in combination with the repetition of a particular message exchange over the first communication line, as it provides fine-tuning of the time alignment of the first and second crosstalk acquisition phases while the loop back through the particular message exchange provides coarse time alignment. This embodiment is particularly advantageous as the time difference between the respective entries into the crosstalk acquisition phase can be almost reduced to zero.

In one embodiment of the invention, stretching the execution of said first handshake phase is conditioned by initialization of said first and second communication channels being requested no longer than a joining time period apart.

So as to not unduly delay initialization of a communication channel, a joining timer is started upon joining of the first communication line and new initialization requests over further inactive communication lines are awaited. After the timer expiry, any new joining line will have to wait till the communication lines that are being initialized complete their initialization and enter show time.

In one embodiment of the invention, duration of said joining time period is dynamically adjusted in dependence of an operational context.

For instance, a long timer value would be used for restart or reboot of the access node as many lines are expected to join in a very short time period, whereas a shorter timer value would be used for restart or reboot of a line termination card, whereas an even shorter timer value would be used during normal operation of the access node (so called tracking mode).

Further characterizing embodiments are mentioned in the appended claims.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
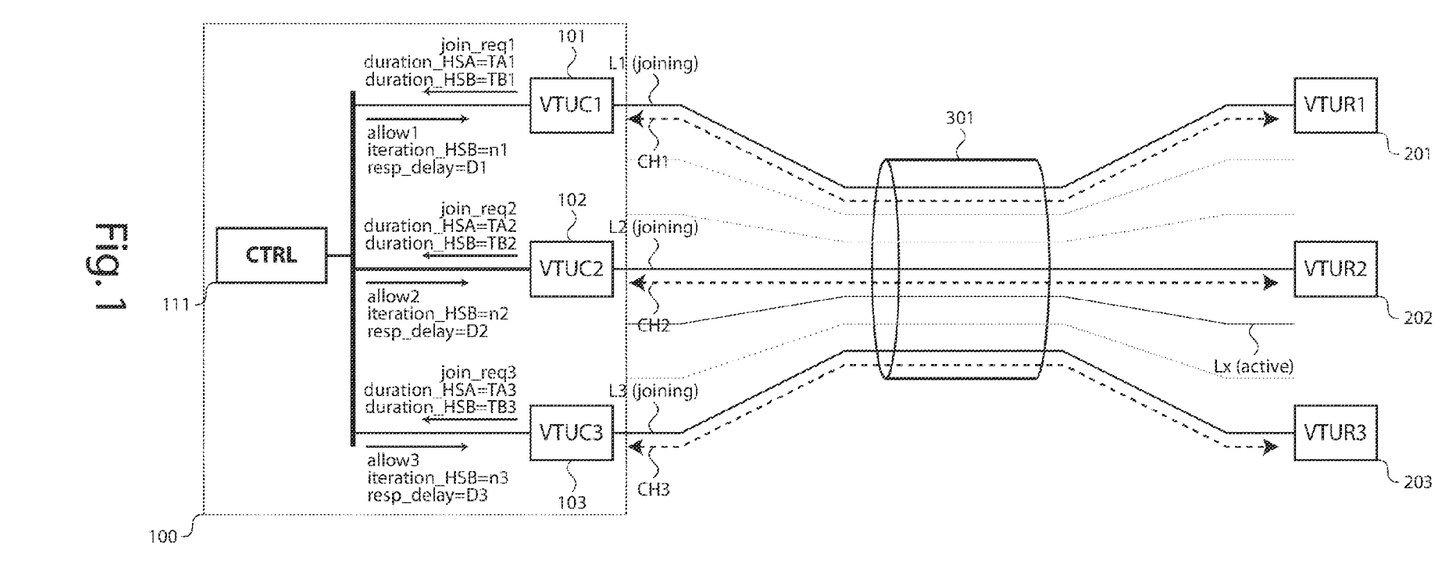
FIG. 1 represents a communication system comprising an access node according to the present invention.

There is seen in FIG. 1 a Digital Subscriber Line Access multiplexer (DSLAM) 100 located at a central office or at a remote location closer to subscriber premises, and comprising the following noticeable functional blocks:

G.993.5 compliant transceiver units 101 (or VTUC1), 102 (or VTUC2) and 103 (or VTUC3), a line initialization controller 111 (or CTRL), The line initialization controller 111 is coupled to the transceivers units 101, 102 and 103.

The DSLAM 100 is coupled to Customer Premises Equipment (CPE) via Unshielded Twisted Pairs (UTP), such as CAT3 cables. Presently, the first transceiver unit 101 is coupled to a first remote transceiver unit 201 (or VTUR1) via a first subscriber line L1; the second transceiver unit 102 is coupled to a second remote transceiver unit 202 (or VTUR2) via a second subscriber line L2; and the third transceiver unit 103 is coupled to a third remote transceiver unit 203 (or VTUR3) via a third subscriber line L3. The remote transceiver units 201, 202 and 203 form part of e.g. a modem, a gateway, a router, a set top box, a laptop, etc.

The subscriber lines L1, L2 and L3 are bundled in a cable binder 301 together with further subscriber lines, and induce crosstalk into each other as they are in close vicinity over whole or part of their length. Presently, crosstalk mostly reduces to Far-End Crosstalk (FEXT): some substantial amount of the signal transmitted by a transceiver unit (the disturber) couples into a neighboring line and impairs reception of the direct signal transmitted over that neighboring line at a remote transceiver unit (the victim). For instance, the downstream signal transmitted by the VTUC 101 over line L1 couples into line L2 and is detected as noise by the VTUR 202. Also, the upstream signal transmitted by the VTUR 203 over line L3 couples into line L1 and is detected as noise by the VTUC 101.

The DSLAM 100 further includes a precoder and/or a post-coder (not shown) for downstream and/or upstream crosstalk cancellation. Presently, the subscriber lines L1, L2 and L3 form part of the same vectoring group, which may comprises further subscriber lines, and the precoder and/or post-coder are configured to cancel downstream and/or upstream crosstalk between lines of the vectoring group.

Typically, the frequency samples of a downstream data symbol are forwarded to the precoder by a transceiver unit, and crosstalk-compensated samples are returned by the precoder to the transceiver unit for Inverse Discrete Fourier Transform (IDFT), Digital to Analog Conversion (DAC) and further transmission over the subscriber line. Similarly, the frequency samples of a received upstream data symbol are forwarded to the post-coder by a transceiver unit, and (almost) crosstalk-free samples are returned by the post-coder to the transceiver unit for detection and demodulation.

Primarily, the transceiver units 101, 102 and 103 are configured to terminate the subscriber lines L1, L2 and L3 respectively, and to initialize and operate DSL communication channels CH1, CH2 and CH3 respectively. So are the remote transceiver units 201, 202 and 203.

The transceiver units 101, 102 and 103 are further configured to notify the line initialization controller 111 about a new line starting up (joining line), being on behalf of the transceiver unit at the central office or the transceiver unit at the customer premises, and further to carry out the DSL initialization procedure after approval from the line initialization controller 111.

The communication channels CH1, CH2 and CH3 comprise a downstream data communication path and an upstream data communication path using distinct downstream and upstream frequency bands (frequency division multiplexing). Respective bit loadings and gains for downstream and upstream carriers are determined and agreed upon during line initialization, thereby yielding a total downstream data rate and a total upstream data rate.

The DSL initialization procedure comprises a handshake phase, multiple crosstalk acquisition phases, a channel discovery phase, a channel training phase, and a channel analysis and exchange phase.

The handshake phase is described in G.994.1, and makes use of one or more predefined set of carriers (so-called signaling family) depending on the one or more specific annex of the recommendation being supported. Those pre-defined carrier sets comprise very few carriers only (typically 2 or 3), thereby causing little interference on neighboring lines.

The handshake procedure comprises a first sub-phase A during which peer transceiver units acknowledge their mutual presence by exchanging probe signals and acquire clock synchronization for symbol rate and carrier frequencies, and a second sub-phase B during which peer transceiver units exchange their respective capabilities and agree on a common mode for training and operation. A successful completion of the handshake phase will lead to the first crosstalk acquisition phase O-P-VECTOR 1.

All messages in the handshake phase are sent with the one or more limited set of carriers. All carrier frequencies within a carrier set, and all carrier sets, are simultaneously modulated with the same data bits using Differential Phase Shift Keying (DPSK). The transmit point is rotated 180° from the previous point if the transmit bit is a 1, and the transmit point is left unchanged if the transmit bit is a 0.

Initially, the VTUR is in state R-SILENT0 transmitting silence, and the VTUC is in state C-SILENT1 transmitting silence.

For duplex mode of operation, and in the event of the VTUR initiating the initialization procedure, the first handshake sub-phase A starts with the VTUR transmitting a R-TONES-REQ signal from one or both of its signaling family with phase reversals every 16 ms. When this has been detected by the VTUC, the VTUC shall respond by transmitting a C-TONES signal from one or both of its signaling family. When this has been detected by the VTUR, the VTUR shall transmit silence (R-SILENT1) for 50 to 500 ms and shall then transmit a R-TONE1 signal from only one signaling family. When the VTUC has detected R-TONE1 signal, it shall respond by transmitting GALF (0x81=one complement of 0x7E) on modulated carriers (C-GALF1). When the VTUR has detected GALF, it shall respond by transmitting FLAGs (0x7E) on modulated carriers (R-FLAG1). When the VTUC has detected FLAGS, it shall respond by transmitting FLAGs (C-FLAG1). When the VTUR has detected FLAGS, it shall enter the sub-phase B by initiating the first message transaction.

In the event of the VTUC initiating the initialization procedure, the first handshake sub-phase A starts with the VTUC directly transmitting C-TONES and keeps on as aforementioned.

Slightly different timing and signals are defined for half-duplex mode of operation.

The second handshake sub-phase B starts with the VTUR sending a CAPABILITY LIST REQUEST CLR message conveying the capabilities of the VTUR (that is to say, a list of possible modes of operation), and whereby the VTUR further requests the VTUC capabilities. The VTUC replies with a CAPABILITY LIST CL message conveying the VTUC capabilities. The VTUR acknowledges the good receipt of the CL message by returning an ACK(1) acknowledgment.

The sub-phase B carries on by either the VTUR or the VTUC selecting a common mode of operation according to the advertised capabilities. This is achieved by issuing a MODE SELECT MS message conveying the selected mode of operation, and by returning an ACK(1) acknowledgment. Typically, the VTUR selects the most appropriate mode of operation at once and issues the MS message. Yet, the VTUR can request the VTUC to select a particular mode of operation by issuing a MODE REQUEST MR message, or can propose a particular mode of operation while leaving the final decision to the VTUC by issuing a MODE PROPOSAL MP message. Once a particular mode of operation is acknowledged, the VTUC and the VTUR enter the O-P-VECTOR 1 and R-P-VECTOR 1 crosstalk acquisition phases respectively.

G.994.1 defines a provision for re-iterating through the sub-phase B by allowing the VTUC to respond to the MS message with a REQUEST-CAPABILITY LIST REQUEST REQ-CLR message requesting the VTUR to proceed again with CLR/CL/ACK(1) message exchange and further MS/MR/MP/ACK(1) message exchange, and without returning to the initial transaction state (R-SILENT0).

The line initialization controller 111 is further configured to control the DSL initialization procedure over each subscriber line, and more specifically to supply the VTUCs 101, 102 and 103 with a number n of iterations for the second handshake sub-phase B to be carried out, as well as with an additional delay D for answering any message requiring a specific response or acknowledgment from the VTUC during the sub-phase B, such as a CLR or MS or MR or MP message.

The VTUCs 101, 102 and 103 are further configured to measure the execution times TA and TB of the first and second handshake sub-phases A and B respectively (not including the configured additional delay D, if any), and to report the so-measured execution time to the line initialization controller 111. By so doing, the execution time spread from different CPE manufacturers and/or implementations is accounted for, and the accuracy of O-P-VECTOR 1 time-alignment is improved.

Although the initialization controller 111 has been depicted as a central unit within the access node 100, it can be partly or wholly distributed across the VTUCs 101, 102 and 103.

Figure 2:
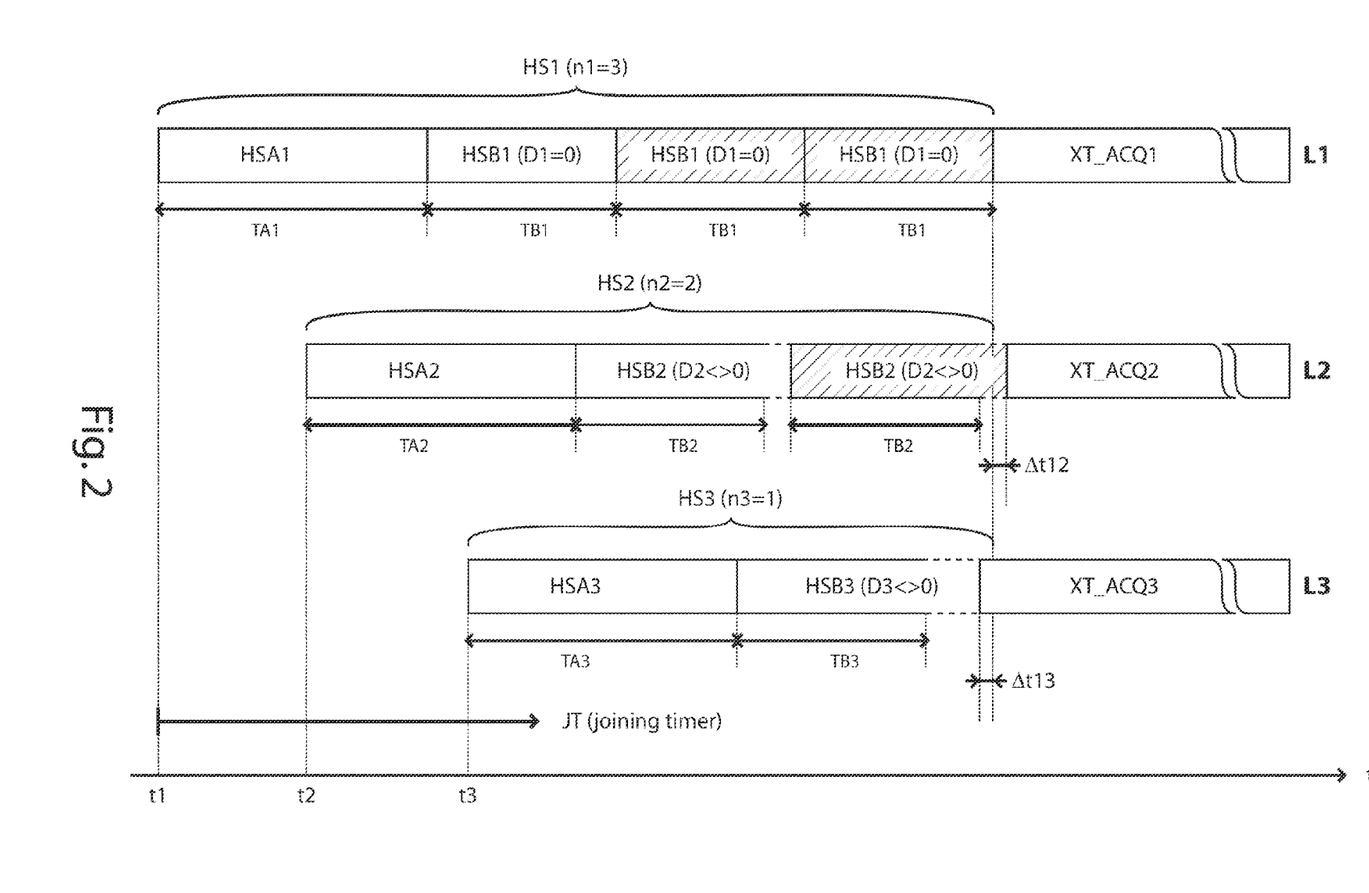
FIG. 2 represents joining communication lines being initialized according to the present invention.

An operation of the DSLAM 100 now follows with reference to FIG. 2.

Initially, the subscriber lines L1, L2 and L3 are inactive (L3 state). It is further assumed that one or more particular subscriber line Lx is already active (see Lx in FIG. 1), meaning that a DSL communication channel is established (L0 state) over that subscriber line. The one or more line Lx form part of the same vectoring group as lines L1, L2 and L3.

At time t1, the VTUC 101 detects a request over the subscriber line L1 whereby the DSL communication channel CH1 is to be initialized. This request is a R-TONES-REQ signal issued by the VTUR 201. Alternatively, the initialization of the DSL channel CH1 can be triggered by the DSLAM 100 in case of e.g. system reboot, power failure, line card failure, management commands, etc.

The VTUC 101 notifies the line initialization controller 111 about the joining event for line L1 (see join_req1 in FIG. 1). Thereupon, the line initialization controller 111 allows line L1 to start up (see allow1 in FIG. 1) and, as the line L1 is the very first line to be initialized, starts a joining timer JT and waits for any new joining event for further line of the same vectoring group.

The line initialization controller 111 further configures the VTUC 101 with a number n1 of iterations of sub-phases B to be carried out over line L1 (see iteration_HSB=n1 in FIG. 1), and with a timer D1 for voluntarily delaying handshake response messages over line L1 (see resp_delay=D1 in FIG. 1).

n1 is chosen according to the maximum time one can afford waiting before O-P-VECTOR 1 crosstalk acquisition phase takes place. Presently, and still with reference to FIG. 2, n1=3 and D1=0 (i.e., reply without delay).

n1 may also be adjusted according to the operational context of the DSLAM 100 at time t1: a large value would be used for system initialization, another intermediate value would be used for partial initialization, and a small value would be used for normal operation.

Upon approval from the line initialization controller 111, the VTUC 101 performs a handshake procedure HS1 comprising a first sub-phase HSA1 and a number n1 of second sub-phases HSB1. Re-iteration through the sub-phase HSB1 is achieved by issuing a REQ-CLR message upon receipt of a MS message from the VTUR 201. For the last iteration, the VTUC 101 acknowledges the MS message from the VTUR 201 and enters O-P-VECTOR 1 crosstalk acquisition phase XT_ACQ1.

The value of the joining timer JT is set according to the following formula:

$$JT = TA1 + n1 \cdot TB1 - \tilde{TA} - \tilde{TB} \qquad (2),$$

wherein TA1 and TB1 respectively denote average time durations of the sub-phases HSA1 and HSB1 as measured by the VTUC 101 over the line L1 and reported to the line initialization controller 111 (see duration_HSA=TA1 and duration_HSB=TB1 in FIG. 1), and wherein $\tilde{TA}$ and $\tilde{TB}$ respectively denote default average time durations of the first and second handshake sub-phases A and B as assumed by the line initialization controller 111.

By so doing, a line joining at time t1+JT (i.e., the maximum joining time) would enter O-P-VECTOR 1 almost simultaneously with line L1.

The execution of the handshake phases over the lines, the initialization of which is requested between t1 and t1+JT, is controlled and adjusted as it will be set forth further for lines L2 and L3.

If a line joins after the joining timer JT expires, then the line initialization controller 111 postpones the initialization of the DSL channel over that line till all the pending initializations complete and initializing lines enter showtime (L0 state). Consequently, the VTUC does not answer the R-TONES-REQ signal and stays in C-SILENT1 state, and the VTUR keeps on repeating the R-TONES-REQ signal until receiving the C-TONES signal from the VTUC.

At subsequent times t2 and t3, requests for line initialization are received over lines L2 and L3 respectively with t1≤t2≤t3≤t1+JT.

The VTUCs 102 and 103 notify the line initialization controller 111 about the joining events for lines L2 and L3 respectively (see join_req2 and join_req3 in FIG. 1). Thereupon, the line initialization controller 111 allows lines L2 and L3 to start up (see allow2 and allow3 in FIG. 1) as the joining timer JT is still running.

The line initialization controller 111 configures the VTUCs 102 and 103 with numbers n2 and n3 of iterations of the sub-phase B (see iteration_HSB=n2 and iteration_HSB=n3 in FIG. 1), and with response delays D2 and D3 (see resp_delay=D2 and resp_delay=D3 in FIG. 1).

Upon approval from the line initialization controller 111, the VTUC 102 performs a handshake procedure HS2 comprising a first sub-phase HSA2 and the number n2 of second sub-phase HSB2, and the VTUC 103 performs a handshake procedure HS3 comprising a first sub-phase HSA3 and the number n3 of second sub-phase HSB3. After successful completion of the handshake procedures HS2 and HS3, the VTUCs 102 and 103 enter O-P-VECTOR 1 crosstalk acquisition phases XT_ACQ2 and XT_ACQ3 respectively.

The values n2 and n3 are determined so as the following inequalities are conformed with:

$$TA1 n1 \cdot TB1 - TB2 \leq t2 - t1 + TA2 + n2 \cdot TB2 \leq TA1 + n1 \cdot TB1 \quad (3),$$

$$TA1 + n1 \cdot TB1 - TB3 \leq t3 - t1 + TA3 + n3 \cdot TB3 \leq TA1 n1 \cdot TB1 \quad (4),$$

wherein TA2 and TB2 respectively denote average time durations of the sub-phases HSA2 and HSB2 as measured by the VTUC 102 over the line L2 and reported to the line initialization controller 111 (see duration_HSA=TA2 and duration_HSB=TB2 in FIG. 1), and wherein TA3 and TB3 respectively denote average time durations of the sub-phases HSA3 and HSB3 as measured by the VTUC 103 over the line L3 and reported to the line initialization controller 111 (see duration_HSA=TA3 and duration_HSB=TB3 in FIG. 1).

By so doing, one brings the entries into XT_ACQ2 and XT_ACQ3 as close as possible to, yet before, the entry into XT_ACQ1. Presently, and still with reference to FIG. 2, n1=2 and n3=1 (i.e., no repetition).

The fine-tuning of O-P-VECTOR 1 time alignment across lines L1, L2 and L3 is achieved by adjusting the handshake response delays D2 and D3 that are used over lines L2 and L3 during HSB2 and HSB3 respectively For instance, assuming that r response messages are issued by the VTUC during one iteration of the sub-phase HSB, one computes the average response delays D2 and D3 that shall be voluntarily added over lines L2 and L3 respectively before issuing a response message as:

$$D2 = \frac{(TA1 + n1 \cdot TB1 - (t2 - t1 + TA2 + n2 \cdot TB2))}{n2 \cdot r}, \quad (5)$$

$$D3 = \frac{(TA1 + n1 \cdot TB1 - (t3 - t1 + TA3 + n3 \cdot TB3))}{n3 \cdot r}. \quad (6)$$

Yet, the so-computed response delays D2 and D3 shall be lower than the applicable timeout value (minus some margin to account for the transmission and processing latency).

By so doing, one can achieve almost perfect time-alignment between the respective O-P-VECTOR 1 phases (see Δt12 and Δt13 that reduce almost to zero in FIG. 2).

The respective duration of the sub-phases A and B as reported by the VTUC are stored in a local data repository of the DSLAM 100, and used later on when lines are initialized. Those values can be stored in association with a particular product ID or alike, and can be an average of the last measured values for a particular product ID.

If no value is available for a specific line (e.g., because that line starts for the very first time), then the default values $\tilde{TA}$ and $\tilde{TB}$ are assumed. As soon as the first measured values are available, they substitute for the default values, and the number of iterations and/or the response delay to be used over that line are updated accordingly.

The responses messages over line L1 may also be delayed (i.e., D1< >0) so as the lines L1, L2 and L3 enter O-P-VECTOR 1 at an arbitrary scheduled time.

After O-P-VECTOR 1 completion, the crosstalk coefficients from the joining lines L1, L2 and L3 into the active line Lx are acquired and used to initialize the corresponding coefficients of the precoding and/or cancellation matrix. From that time onwards, downstream and/or upstream crosstalk from the new joining lines L1, L2 and L3 is canceled over the active line Lx, and the lines L1, L2 and L3 can enter the CHANNEL DISCOVERY PHASE without impairing communication over the active line Lx.

In an alternative embodiment of the present invention, responses are not delayed (D1=D2=D3=0), and the line initialization controller 111 performs coarse alignment only by re-iterating through the second handshake sub-phase B. The formulas (4) and (5) for computing n2 and n3 shall be advantageously replaced by:

$$n2 = i, \min_{i \in [1, n1-1]} |(TA1 + n1 \cdot TB1) - (t2 - t1 + TA2 + i \cdot TB2)|, \quad (7)$$

$$n3 = i, \min_{i \in [1, n1-1]} |(TA1 + n1 \cdot TB1) - (t3 - t1 + TA3 + i \cdot TB3)|. \quad (8)$$

In still an alternative embodiment of the present invention, the line initialization controller 111 does not re-iterate through the second handshake sub-phase B (n1=n2=n3=1), but only adjusts the response delays D1, D2 and D3 such that D1≤D2≤D3, thereby shortening (within the timeout boundaries) the time differences Δt12 and Δt13 between the respective entries into O-P-VECTOR 1.

In still an alternative embodiment of the present invention, the line initialization controller 111 executes the handshake procedure over line L3 at a nominal pace (D3=0) and without re-iterating through sub-phase B (n3=1). The number of iterations and the response delays over lines L1 and L2 are adjusted so as lines L1 and L2 enter XT_ACQ1 and XT_ACQ2 when line L3 is expected to enter XT_ACQ3.

In still an alternative embodiment, the number of iterations and/or the response delays are dynamically adjusted based on the respective measured time shifts between alike handshake transactions (e.g., the receipt of the MS message from the VTUR). The VTUC 101, 102 and 103 are then further configured to report those specific handshake milestones to the line initialization controller 111 so as it can dynamically adjust the number of iterations and the response delays accordingly. For instance, if a certain handshake milestone is detected over line L1 before being detected over line L2, then D1 is increased with respect to D2. If line L1 is unable to catch up with line L2 (because response delays are upper-bounded by the timeout value), then another message round is requested for both lines L1 and L2 so as to give another opportunity for line L1 to catch up with line L2.

Although the present invention has been described with exhaustive reference to G.993.5 DSL technology, it is similarly applicable to further wireline access technologies.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. An access node for providing broadband communication services to subscribers, and comprising a first transceiver unit for initializing a first communication channel over a first communication line and a second transceiver unit for subsequently initializing a second communication channel over a second communication line, which initialization of said first and second communication channels respectively comprising first and second handshake phases whereby peer transceiver units exchange capabilities and select a common mode of operation, first and second crosstalk channel acquisition phases from said first and second communication lines into further active communication lines, and further first and second generic initialization phases, wherein said access node further comprises a line initialization controller configured to stretch the execution of said first handshake phase with respect to the execution of said second handshake phase so as to shorten a time difference between respective entries into said first and second crosstalk channel acquisition phases.

2. The access node of claim 1, wherein said first transceiver unit is further configured to, under control of said line initialization controller, reiterate through a particular message exchange during said first handshake phase with a number of iterations of said particular message exchange during said first handshake phase greater than a respective number of iterations of said particular message exchange during said second handshake phase.

3. The access node of claim 2, wherein said particular message exchange comprises the exchange of a Capability List Request CLR message, a Capability List CL message and a Mode Selection MS message,
and wherein said first transceiver unit is further configured to reiterate through said particular message exchange by issuing a Request REQ-CLR message for a Capability List Request CLR message.

4. The access node of claim 1, wherein said first transceiver unit is further configured to, under control of said line initialization controller, intentionally delay response messages during said first handshake phase by an amount of time averagely greater than a respective amount of time used during said second handshake phase.

5. The access node of claim 2, wherein said second transceiver unit is further configured to, under control of said line initialization controller, intentionally delay response messages during said second handshake phase by an amount of time averagely greater than a respective amount of time used during said first handshake phase.

6. The access node of claim 1, wherein stretching the execution of said first handshake phase with respect to the execution of said second handshake phase is conditioned by initialization of said first and second communication channels being requested no longer than a joining time period apart.

7. The access node of claim 6, wherein duration of said joining time period is dynamically adjusted in dependence of an operational context.

8. The access node of claim 1, wherein said access node is a Digital Subscriber Line Access Multiplexer DSLAM, and wherein said first and second communication channels are Digital Subscriber Line DSL channels.

9. A method for initializing communication channels over communication lines, and comprising the steps of initializing a first communication channel over a first communication line and subsequently initializing a second communication channel over a second communication line, which initialization of said first and second communication channels respectively comprising first and second handshake phases whereby peer transceiver units exchange capabilities and select a common mode of operation, first and second crosstalk channel acquisition phases from said first and second communication lines into further active communication lines, and further first and second generic initialization phases, wherein said method further comprises the step of stretching the execution of said first handshake phase with respect to the execution of said second handshake phase so as to shorten a time difference between respective entries into said first and second crosstalk channel acquisition phases.

10. The method of claim 9, wherein stretching the execution of said first handshake phase with respect to the execution of said second handshake phase is achieved by reiterating through a particular message exchange during said first handshake phase with a number of iterations of said particular message exchange during said first handshake phase greater than a respective number of iterations of said particular message exchange during said second handshake phase.

11. The method of claim 10, wherein said particular message exchange comprises the exchange of a Capability List Request CLR message, a Capability List CL message and a Mode Selection MS message, and wherein reiteration through said particular message exchange is achieved by issuing a Request REQ-CLR message for a Capability List Request CLR message.

12. The method of claim 9, wherein stretching the execution of said first handshake phase with respect to the execution of said second handshake phase is achieved by intentionally delaying response messages over said first communication line by an amount of time averagely greater than a respective amount of time used over said second communication line.

13. The method of claim 10, wherein said method comprises the further step of intentionally delaying response messages during said second handshake phase by an amount of time averagely greater than a respective amount of time used during said first handshake phase.

14. The method of claim 9, wherein stretching the execution of said first handshake phase with respect to the execution of said second handshake phase is conditioned by initialization of said first and second communication channels being requested no longer than a joining time period apart.

15. The method of claim 14, wherein duration of said joining time period is dynamically adjusted in dependence of an operational context.

\* \* \* \* \*